Patented June 17, 1930

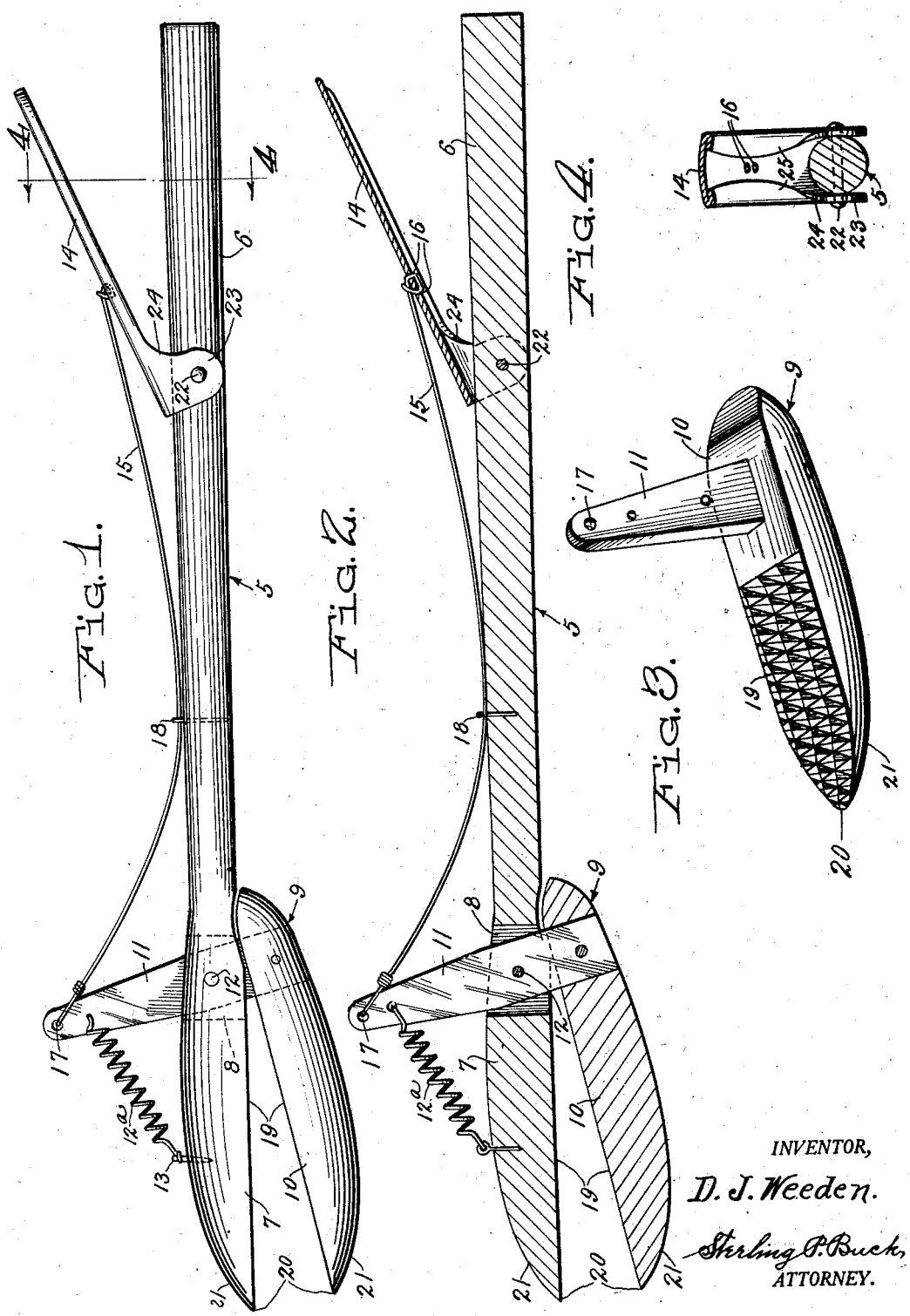

1,764,919

UNITED STATES PATENT OFFICE

DANIEL J. WEEDEN, OF EAST GREENWICH, RHODE ISLAND

TONGS

Application filed August 10, 1927. Serial No. 212,044.

This invention relates to tongs, and especially to a very simple and improved form of tongs for pulling weeds, thinning corn and the like.

One object of the invention is to provide a device of this character which is comparatively simple, so it can be manufactured at a low cost.

Another object is to provide a device of this character which is strong and durable, but the main object is to provide such device which is thoroughly effective for gripping the stalks and roots of weeds and young corn so as to lift the roots bodily from the ground.

Other objects and important features are pointed out or implied in the following details of description, in connection with the accompanying drawings in which:

Figure 1 is a side elevation of an implement constructed in accordance with my invention.

Figure 2 is a longitudinal sectional view.

Figure 3 is a perspective view of the movable jaw of the tongs.

Figure 4 is a transverse sectional view along the line 4—4 of Figure 1.

Referring to these drawings in detail, in which similar reference characters correspond to similar parts in the several views, it will be seen that the device includes a substantially rectilinear member 5 which includes a handle portion 6, a fixed jaw 7 and a through slot 8. A substantially L-shaped member 9 includes a movable jaw 10 and an arm 11, the latter being pivoted at 12 while extending through the slot 8 to a considerable distance at the opposite side of the member 5 from the jaw member 10.

A retractile spring 12ª has one end secured to an anchoring element 13 on the fixed jaw 7, the other end of the spring being secured to the outer end portion of the arm 11, so it holds said arm substantially in the position shown, but permits the arm to be moved towards the handle member 6 by means of a combined handle member and actuating lever 14 and a link 15. This link is preferably of flexible wire such as steel or the like, and one end is secured through spaced apertures 16 of the lever 14, while the other end is secured through an aperture 17 of the arm 11. A guiding member 18 may be provided for the wire 15 to slide through, although this element is not strictly essential. While the member 9 is shown as constructed of two separately formed parts 10 and 11, it is quite within the scope of this invention to form these parts integrally, also to make the arm 11 wider and thinner than shown in the drawings, thereby not only making this part stronger, but reserving greater strength in the part 5 by reducing the width of the slot 8.

The jaws are preferably semi-circular in cross section, and taper to a sharp point which forms the terminal of a substantially plane knurled roughened gripping surface 19. By this construction, the sharp points 20 can be forced into the ground at opposite sides of a weed or vegetable to be pulled, and the adjacent convex converging surfaces 21 tend to force the jaws towards one another, thereby aiding the lever 14 and wire 15 in closing the jaws upon the plant-stalk or root, it being understood that the user presses the parts 6 and 14 towards one another for assisting the parts 21 in forcing the jaws upon the plant-stalk or root; and now, having gripped the plant, the user begins to pull, and because of the inclined portion of the lever 14, and its pivotal connection at 22, it is moved more and more forcibly towards the part 6, thereby gripping the plant more and more firmly, while the knurled surfaces 19 prevent the plant from slipping from between the jaws.

The lever 14 is formed of a single blank of sheet metal, its ears 23 being apertured to receive the pivot 22, and spaced from one another to receive the member 5 therebetween. The ears 22 are gradually curved at 24 to provide strength at the point of greatest strain, and at the same time, the edges of the blank are folded under the body of the lever, as shown at 25, this not only providing strength for the lever, but also providing it with smooth and evenly curved lateral edges which insure the maximum of comfort to the users of the device.

Although I have described this simple embodiment of my invention very specifically, I do not intend to limit my patent protection to these exact details of construction and arrangement, but changes may be made within the scope of the inventive idea as implied and claimed.

What I claim as my invention is:

In an implement of the class described, the combination of a substantially rectilinear member including a handle portion and a jaw which has a substantially plane sharp pointed gripping surface and has its remaining surface converging to the sharp point at the end of said gripping surface, a movable jaw having its free end formed substantially the same as that of the first mentioned jaw and having an arm extending substantially at right angles from its plane surface and being pivotally connected to the said rectilinear member, a lever pivoted to said rectilinear member, a link connecting said arm to said lever and being operable by the latter for closing the jaws with respect to one another, and spring means to hold the jaws normally open with respect to one another.

In testimony whereof I affix my signature.

DANIEL J. WEEDEN.